US010269246B2

(12) United States Patent
Kamini et al.

(10) Patent No.: US 10,269,246 B2
(45) Date of Patent: Apr. 23, 2019

(54) VEHICLE LOCATOR AND GUIDE

(71) Applicant: GM Global Technology Operations LLC, Detroit, MI (US)

(72) Inventors: Aditya S. Kamini, Bloomfield Hills, MI (US); Richard Elswick, Warren, MI (US); Christopher L. Oesterling, Troy, MI (US); Nathaniel H. Williams, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/616,345

(22) Filed: Jun. 7, 2017

(65) Prior Publication Data
US 2018/0357898 A1 Dec. 13, 2018

(51) Int. Cl.
*H04N 5/272* (2006.01)
*G08G 1/127* (2006.01)
*H04N 7/18* (2006.01)
*H04N 5/232* (2006.01)

(52) U.S. Cl.
CPC ......... *G08G 1/127* (2013.01); *H04N 5/23293* (2013.01); *H04N 5/272* (2013.01); *H04N 7/185* (2013.01)

(58) Field of Classification Search
CPC .... G08G 1/127; H04N 5/23293; H04N 5/272; H04N 7/185

USPC ......................................................... 348/148
See application file for complete search history.

(56) References Cited

U.S. PATENT DOCUMENTS

| 2003/0193390 | A1* | 10/2003 | Muramatsu | B60R 25/04 340/426.13 |
| 2005/0125117 | A1* | 6/2005 | Breed | G07C 5/008 701/31.5 |
| 2015/0105933 | A1* | 4/2015 | Martin | G07C 5/0866 701/1 |

* cited by examiner

*Primary Examiner* — Nguyen T Truong
(74) *Attorney, Agent, or Firm* — Reising Ethington P.C.; David Willoughby

(57) ABSTRACT

A system and method of presenting vehicle information to a user at a handheld mobile device, the method including: receiving a request from a user for vehicle information; sending a vehicle information request to a remote server, wherein the vehicle information request includes a location associated with the user; receiving a vehicle information response at the handheld mobile device, wherein the vehicle information response includes information pertaining to one or more vehicles within a predetermined distance of the location associated with the user; displaying a camera feed on a visual display of the handheld mobile device; based on the information pertaining to the one or more vehicles, generating one or more graphics representing at least part of the information pertaining to the one or more vehicles; and displaying the one or more graphics over the camera feed on the visual display of the handheld mobile device.

10 Claims, 5 Drawing Sheets

VEHICLE LOCATOR AND GUIDE

INTRODUCTION

The disclosure relates to presenting nearby vehicle information at a handheld mobile device.

Many electronic devices and network systems can be used to implement myriad services and provide numerous functionality to users. Such electronic devices can be incorporated into vehicles and can be used to provide the vehicle certain services and/or information. Also, vehicle information, such as the vehicle's location, can be sent from the vehicle to a remote server or database, and from a remote server to a mobile device. The remote network, which can include servers and databases, can use remote network communications, such as via TCP/IP, to provide the vehicle and vehicle users various services, such as providing a car sharing service. Additionally, handheld mobile devices, such as smartphones, can be used in conjunction with such services and may be used to provide a user of the handheld mobile device information pertaining to the vehicle.

SUMMARY

According to a first embodiment, there is provided a method of presenting vehicle information to a user at a handheld mobile device, the method including: receiving a request from a user for vehicle information; sending a vehicle information request to a remote server, wherein the vehicle information request includes a location associated with the user; receiving a vehicle information response at the handheld mobile device, wherein the vehicle information response includes information pertaining to one or more vehicles within a predetermined distance of the location associated with the user, and wherein the vehicle information response is sent to the handheld mobile device in response to the vehicle information request; displaying a camera feed on a visual display of the handheld mobile device; based on the information pertaining to the one or more vehicles, generating one or more graphics representing at least part of the information pertaining to the one or more vehicles; and displaying the one or more graphics over the camera feed on the visual display of the handheld mobile device.

According to other embodiments, there is provided that of the first embodiment further including any one or more of the following:
- wherein the handheld mobile device is a smartphone, a tablet, a wearable mobile device, or an electronic ocular device;
- wherein the location associated with the user is a present location of the user or a location that was inputted into the handheld mobile device by the user;
- wherein the vehicle information request includes one or more reservation parameters in addition to the location associated with the user;
- wherein the one or more reservation parameters includes the predetermined distance of the location associated with the user;
- wherein the remote server is configured to generate the vehicle information response in response to receiving the vehicle information request;
- wherein the remote server is further configured to retrieve information pertaining to the one or more vehicles that are within the predetermined distance of the location associated with the user from a database located at the same location as the remote server;
- wherein the remote server is configured to send one or more vehicle inquiry messages to the one or more vehicles that are within the predetermined distance of the location associated with the user, and to receive one or more vehicle inquiry response messages from the one or more vehicles that are within the predetermined distance of the location associated with the user; and/or
- wherein the remote server uses at least some data contained in the one or more vehicle inquiry response messages to generate the vehicle information response.

According to a second embodiment, there is provided a method of presenting vehicle information to a user at a handheld mobile device, wherein the handheld mobile device includes a processing, a memory device, a camera, and a visual display, and wherein the method including: receiving a request from a user for nearby vehicle availability information and vehicle location information, wherein the vehicle availability information includes information relating to availability of one or more vehicles, and wherein the vehicle location information includes information relating to a location of the one or more vehicles; sending a vehicle information request to a remote server, wherein the vehicle information request includes a location associated with the user, wherein the location associated with the user is a present location of the user or a specified reservation location; receiving a vehicle information response at the handheld mobile device, wherein the vehicle information response includes information pertaining to the one or more vehicles within a predetermined distance of the location associated with the user, and wherein the vehicle information response is sent to the handheld mobile device in response to the vehicle information request; receiving video data from the camera included in the handheld mobile device; displaying the video data on the visual display of the handheld mobile device; based on the information pertaining to the one or more vehicles, generating one or more graphics representing at least part of the information pertaining to the one or more vehicles; and displaying the one or more graphics over the video data on the visual display of the handheld mobile device, wherein the video data includes images of an area surrounding the user, wherein the one or more graphics are displayed on the visual display such that the graphics aid the user in locating at least one of the one or more vehicles.

BRIEF DESCRIPTION OF THE DRAWINGS

Exemplary embodiments will hereinafter be described in conjunction with the appended drawings, wherein like designations denote like elements, and wherein.

DETAILED DESCRIPTION

The system and methods below enable a handheld mobile device to present information pertaining to one or more nearby vehicles to a user. Many embodiments of the method generally include: sending a vehicle information request to a remote server, receiving vehicle information that pertains to one or more vehicles near the user or handheld mobile device, and displaying one or more graphics over the camera feed, wherein the graphic(s) represent information pertaining to the one or more vehicles. In one scenario, a user may initiate a vehicle reservation search process to use a vehicle that is a part of a car-sharing service and that is nearby (e.g., within a predetermined distance of the user or mobile device). The user may use an application on a handheld mobile device, such as a smartphone, to initiate the vehicle reservation search process. The application may then, in response to querying a remote server, present vehicle information to the user, which can be embodied in one or more graphics that are displayed on a visual display of the handheld mobile device.

In one embodiment, the handheld mobile device may use a rear-facing camera to display a live video feed of a field of view. The user may hold up the handheld mobile device in front of his/her face such that the rear-facing camera captures a field of view that is in front of the user. Then, or concurrently, the mobile device can overlay one or more graphics onto the video feed. These graphics can be used to direct a user to one or more nearby vehicles and/or present information pertaining to one or more of the nearby vehicles, the surrounding environment of the user, and/or other useful information. In one embodiment, navigation aid graphics (discussed more below) can be generated and displayed to assist a user in locating and/or navigating to a nearby vehicle.

Figure 1:
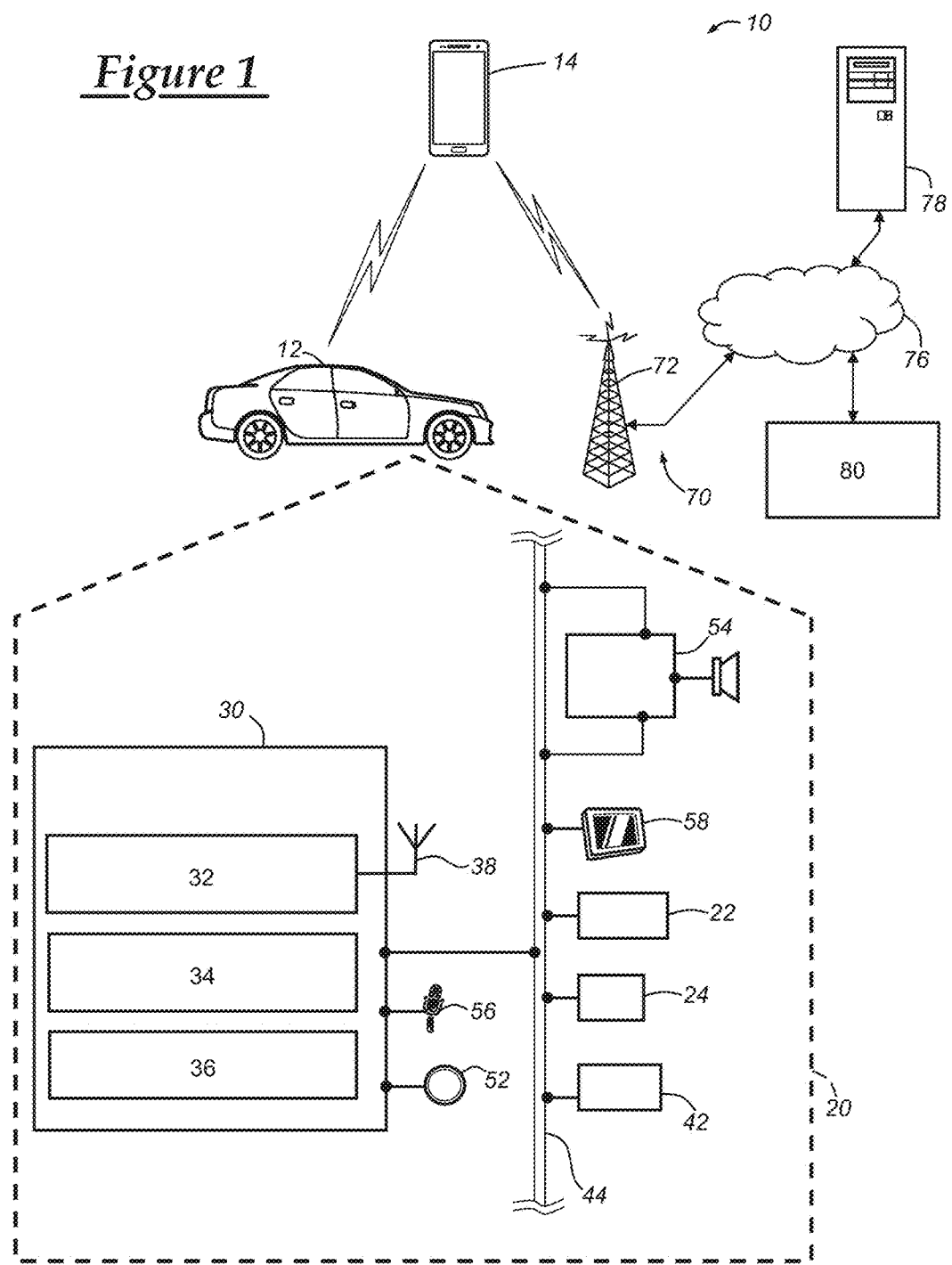
FIG. 1 is a block diagram depicting an embodiment of a communications system that is capable of utilizing the method disclosed herein.

Referring now to FIG. 1, there is shown an operating environment that comprises a communications system 10 and that can be used to implement the method disclosed herein. Communications system 10 generally includes vehicles 12 (only one shown) with a wireless communications device 30, a handheld mobile device 14, one or more wireless carrier systems 70, a land communications network 76, a computer 78, and a remote facility 80. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which include telematics equipment in vehicle 12). Carrier system 70 can implement any suitable communications technology, including for example GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide unidirectional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicles 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as a web server accessible by vehicles 12 or handheld mobile device 14. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicles 12, handheld mobile device 14, remote facility 80, or any combination thereof. A computer 78 can also be used for providing Internet connectivity such as DNS services or as a network address server that uses DHCP or other suitable protocol to assign IP addresses to the vehicles 12 or handheld mobile device 14.

Remote facility 80 may be designed to provide the vehicle electronics 20 (discussed below) and handheld mobile device 14 with a number of different system back-end functions. For example, remote facility 80 may be used in part to implement a car sharing service. In such a case, remote facility 80 may coordinate registrations of vehicles, store data pertaining to the registrations or other aspects of the car sharing service, and/or provide authentication and authorization data to SRWC devices (e.g., handheld mobile device 14), users, and/or vehicles. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle identifiers, profile records, behavioral patterns, and other pertinent subscriber information. Data transmissions may also be conducted by wireless systems, such as IEEE 802.11x, GPRS, and the like. Although the illustrated embodiment has been described as it would be used in conjunction with a manned remote facility 80 using a live advisor, it will be appreciated that the remote facility can instead utilize a VRS as an automated advisor or, a combination of the VRS and the live advisor can be used. The remote facility 80 or computer 78 can include numerous servers and databases that can be used in conjunction with one or more steps of certain embodiments of the method discussed herein. In such embodiments, the remote facility 80 or computer 78 can store vehicle information in one or more databases (or memory devices) and can communicate with a vehicle-sharing, application on the handheld mobile device 14, as discussed in more detail below.

Vehicle 12 (only one is shown in FIG. 1) is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a wireless communications device 30, a GNSS module 22, engine control unit (ECU) 24, other VSMs 42, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the GNSS module 22, engine control unit (ECU) 24, wireless communications device 30, vehicle user interfaces 52-58, as will be described in detail below. The vehicle 12 can also include other VSMs 42 in the form of electronic hardware components that are located throughout the vehicle and, which may receive input from one or more sensors and use the sensed input to perform diagnostic, monitoring, control, reporting, and/or other functions. Each of the VSMs 42 is preferably connected by communications bus 44 to the other VSMs, as well as to the wireless communications device 30, and can be programmed to run vehicle system and subsystem diagnostic tests. One or more VSMs 42 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Wireless communications device 30 is capable of communicating data via short-range wireless communications (SRWC) or via cellular communications. As shown in the exemplary embodiment of FIG. 1, wireless communications device 30 includes a wireless chipset 32, a processor 34, memory 36, and one or more antennas 38 (only one is shown for illustrative purposes). Also, wireless communications device 30 can be directly connected to one or more vehicle user interfaces, such as microphone 56 and/or pushbutton 52. In one embodiment, wireless communications device 30 may be a standalone module or, in other embodiments, device 30 may be incorporated or included as a part of one or more other vehicle system modules, such as a center stack module (CSM), body control module, an infotainment module, a telematics module, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short-range wireless communications (SRWC) such as any of the IEEE 802.11 protocols, Wi-Fi™, WiMAX™, ZigBee™, Wi-Fi Direct™, Bluetooth™, Bluetooth Low Energy™ (BLE), or near field communication (NFC). The short-range wireless communication chipset 32 enables the wireless communications device 30 to transmit and receive SRWC, such as BLE. The SRWC chipset may allow the device 30 to connect to another SRWC device. As used herein, a short-range wireless communications (SRWC) device is a device capable of SRWC. Additionally, in many embodiments, the wireless communications device may contain a cellular chipset thereby allowing the device to communicate via one or more cellular protocols, such as those used by cellular carrier system 70. In other embodiments, a separate telematics unit can be provided and used to carry out cellular communications.

In one embodiment, the wireless communications device 30 may operate both when the vehicle is in a powered on state and when the vehicle is in a powered off state. As used herein, a "powered on state" is a state of the vehicle in which the ignition or primary propulsion system of the vehicle is powered on and, as used herein, a "powered off state" is a state of the vehicle in which the ignition or primary propulsion system of the vehicle is not powered on. The operation or state of the wireless communications device 30 may be controlled by another vehicle system module, such as by a BCM or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations.

The vehicle may use the wireless communications device 30 to detect other SRWC devices, such as handheld mobile device 14. A connection between the wireless communications device 30 and one or more devices 14 may allow for the operation of various vehicle-device functionality, and may be established when the handheld mobile device 14 comes within a predetermined distance of the vehicle. Vehicle-device functionality refers to any function of the vehicle that may be complimented, improved, supported, or carried out through a handheld mobile device; any function of the handheld mobile device that may be complimented, improved, supported, or carried out through the vehicle; or any other function that may be carried out using the vehicle and one or more handheld mobile devices. For example, vehicle-device functionality can include using the handheld mobile device to provide the vehicle with a contact list that may be displayed on visual display 58, audio/visual media content to be played via speakers 54 or display 58, navigational information (e.g., start and/or end locations), and/or vehicle commands or instructions that direct the vehicle to perform some operation. Other examples of vehicle-device functionality include using the vehicle electronics to provide the handheld mobile device with hands-free calling, such as through use of vehicle-user interfaces to place, receive, and carry out voice calls; sending information to the handheld mobile device, such as geographical information to the handheld mobile device (such as information obtained from the GPS module 22) or vehicle diagnostic information or codes; and carrying out commands received at the vehicle from the handheld mobile device.

Upon detection of a SRWC device (e.g., a handheld mobile device) or receipt of a wireless message, the wireless communications device 30 may communicate with the SRWC device by transmitting and receiving one or more wireless messages. These messages may include authenticating or otherwise verifying the identity of the SRWC device which sent (or ostensibly sent) the wireless message, authorizing the SRWC device using one or more authorization techniques (as discussed more below), and/or pairing the SRWC device and the wireless communications device 30 (e.g., such as through Bluetooth™ or Bluetooth Low Energy™ pairing). Additionally, upon detection of a SRWC device, the wireless communications device 30 may determine whether the wireless communications device 30 is bonded to the SRWC device. As used herein, "bonded" means that two devices (e.g., the wireless communications device 30 and handheld mobile device 14) have previously been paired and each stores a common secret key, identifier, and/or other information that allows the devices to subsequently establish a new Bluetooth™ connection without pairing (i.e., exchanging security codes or keys). "Bluetooth™ bonded" refers to devices that are bonded using Bluetooth™ as the SRWC. As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed.

Once a connection is established between the wireless communications device 30 and the handheld mobile device, such as mobile device 14, wireless messages may be sent between the vehicle and the handheld mobile device. These wireless messages and/or the SRWC that sent these wireless messages may be authenticated and/or authorized by the vehicle. The authorization and/or authentication of the handheld mobile device (or other SRWC device) may include verifying the identity of the handheld mobile device and/or the user of the handheld mobile device, as well as checking for authorization of the handheld mobile device and/or the user of the handheld mobile device. This verification may include comparing a key (e.g., a string or array of bits) included in the connection request (or subsequent message) with a key that the vehicle obtained from a remote facility 80.

The communications between the vehicle and the handheld mobile devices may allow for functionality of the smartphone to be used by the vehicle electronics, or vice versa. For example, in the case where the handheld mobile device is a cellular-enabled smartphone, received calls at the smartphone may be carried out through the audio system 54 and/or through use of microphone 56 of the vehicle electronics 20. This may be done so through the phone sending all received audio data or signals to the wireless communications device 30, which then may use bus 44 to send the audio signals to audio system 54. Likewise, video received at the smartphone 14 may be sent to the visual display 58 via the wireless communications device 30. Also, audio received at microphone 56 in the vehicle electronics may be sent to the smartphone 14 via wireless communications device 30.

Wireless communications device 30 may be in communication with one or more remote networks via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30 via, for example, a telematics unit included in the vehicle. In one embodiment, the communications device 30 may also include a cellular chipset or be communicatively coupled to a device comprising a cellular chipset such as a telematics unit. In either event, communications device 30 may, via a cellular chipset, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 34 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 34 executes various types of digitally-stored instructions, such as software or firmware programs stored in memory 36, which enable the device 30 to provide a wide variety of services. Memory 36 may include RAM, other temporary powered memory, any non-transitory computer-readable medium (e.g., EEPROM), or any other electronic computer medium that stores some or all of the software needed to carry out the various external device functions discussed herein.

Global Navigation Satellite System (GNSS) or global position system (GPS) module 22 receives radio signals from a constellation of GNSS satellites (not shown). From these signals, the module 22 can determine vehicle position which may enable the vehicle to determine whether it is at a known location, such as home or workplace. Moreover, GNSS module 22 can provide this location data to wireless communications device 30, which can then use this data to identify known locations, such as a vehicle operator's home or workplace, as well as to carry out the method described herein. Additionally, GNSS module 22 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GNSS module 22), or some or all navigation services can be done via a telematics unit installed in the vehicle, wherein the position information is sent to a remote location for purposes of providing the vehicle with navigation maps, map annotations (points of interest, restaurants, etc. route calculations, and the like. The position information can be supplied to remote facility 80 or other remote computer system, such as computer 78, for other purposes, such as fleet management and/or for use in a car sharing service. Also, new or updated map data can be downloaded to the GNSS module 22 from the remote facility 80 via a vehicle telematics unit. Other satellite navigation systems may be used as well.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 44 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Figure 2:
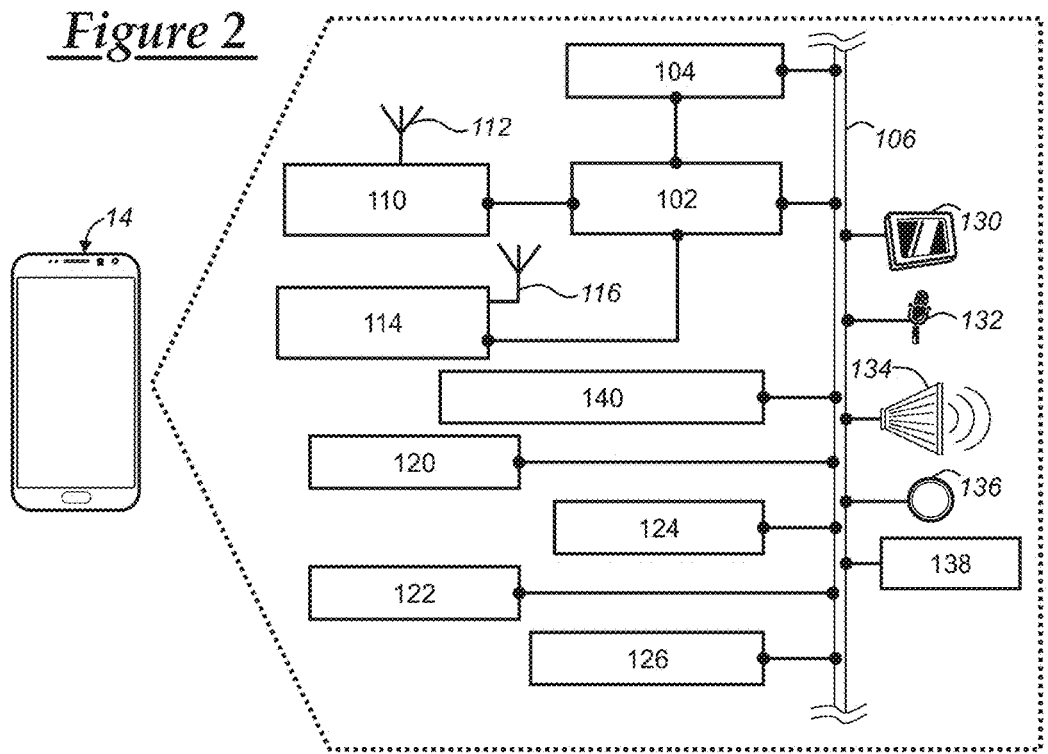
FIG. 2 is a block diagram depicting an embodiment of a handheld mobile device and illustrates some hardware and components of the handheld mobile device.
Figure 3:
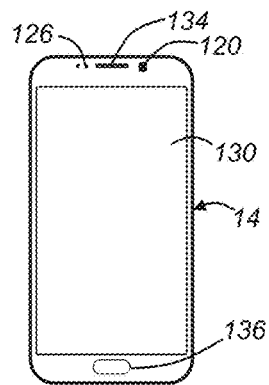
FIG. 3 is a block diagram depicting a front view of the handheld device of FIG. 2 where the device is depicted as front-facing.
Figure 4:
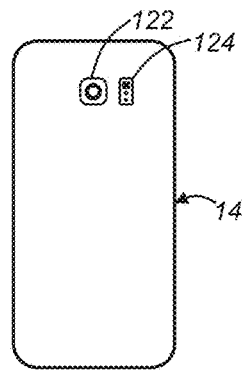
FIG. 4 is a block diagram depicting a rear view of the handheld device of FIG. 2 where the device is depicted as rear-facing.

With reference to FIGS. 2-4, there is shown a schematic view of the hardware and components of a handheld mobile device 14 (FIG. 2), along with a front view (FIG. 3) and a back view (FIG. 4) of a handheld mobile device 14. Device 14 is shown as a smartphone having cellular telephone capabilities; however, in other embodiments, device 14 may be a tablet, a wearable electronic device (e.g., a smartwatch or an electronic ocular device or any other suitable device. As used herein, a handheld mobile device is a device that is capable of network communications and that is portable by a user, such as a wearable device (e.g., a smartwatch), an implantable device, or a handheld device (e.g., a smartphone, a tablet, a laptop). The mobile device includes: hardware, software, and/or firmware enabling cellular telecommunications and/or short range wireless communications (SRWC), as well as other wireless device functions and applications. The hardware of mobile device 14 comprises a processor 102, memory 104, wireless chipsets 110,114, antennas 112,114, cameras 120,122, GLASS module 138, accelerometer 140, and various user-device interfaces.

Processor 102 can be any type of device capable of processing electronic instructions and can execute such instructions that may be stored in memory 104, such as those devices and types of instructions discussed above with respect to processor 32 in wireless communications device 30. For instance, processor 102 can execute programs or process data to carry out at least a part of the method discussed herein. The processor may also execute an operating system for the handheld device, such as Android™, iOS™, Microsoft™ Windows™, and/or other operating systems. The operating system may provide a user interface and a kernel, thereby acting as a central control hub that manages the interfacing between the hardware and software of the device. Moreover, the operating system may execute mobile applications, software programs, and/or other software or firmware instructions. In one embodiment, the processor can execute a vehicle-sharing application that enables a user to make vehicle reservations and to assist a user in locating potential vehicles to reserve or vehicles that the user has reserved.

Memory 104 may include RAM, other temporary powered memory, any non-transitory computer-readable medium (e.g., EEPROM), or any other electronic computer medium that stores some or all of the software needed to carry out the various external device functions discussed herein. In other embodiments, memory 104 may be a non-volatile memory card, such as a Secure Digital™ (SD) card, that is inserted into a card slot of device 14.

The processor 102 and/or memory 104 may be connected to a communications bus 106, which allows for the communication of data between the processor and other components of the device 14, such as cameras 120,122, camera flash 124, LED indicator 126, visual display 130, microphone 132, speaker 134, pushbutton 136, GNSS module 138, accelerometer 140, and various other components. The processor 102 may provide processing power for such components and/or may, through the operating system, coordinate functionality of the components, while the memory 104 may allow for storage of data that may be usable by such components. For example, the processor may run the primary operating system for the device 14, which may include displaying a graphical user interface (GUI) on a touchscreen display 130. In such an example, the GUI may include the display of images that may be stored in memory 104. The mobile device processor and software stored in the memory also enable various software applications, which may be preinstalled or installed by a user or by a manufacturer. This may include an application (e.g., the vehicle-sharing application) that can allow the device 14 to provide a car sharing service interface system that can be used with remote computer 78, remote facility 80, and/or vehicles 12. This vehicle-sharing application may use one or more of the components of the device 14, such as display 130, front-facing camera 120, rear-facing camera 122, GNSS module 138, accelerometer 140, and speaker 134, as will be discussed in more detail below.

The handheld mobile device 14 includes a short range wireless communications (SRWC) chipset 110 and SRWC antenna 112, which allows it to carry out SRWC, such as any of the IEEE 802.11 protocols, WiMAX™, ZigBee™, Wi-Fi Direct™, Bluetooth™ or near field communication (NFC). The SRWC chipset may allow the device 14 to connect to another SRWC device.

Additionally, handheld mobile device 14 contains a cellular chipset 114 thereby allowing the device to communicate via one or more cellular protocols, such as GSM/GPRS technology, CDMA or CDMA2000 technology, and LIE technology. Device 14 may communicate data over wireless carrier system 70 using the chipset 114 and cellular antenna 116. Although the illustrated embodiment depicts a separate chipset and antenna for SRWC and cellular communications chipsets, in other embodiments, there may be a single antenna for both chipsets, a single chipset and multiple antennas, or both a single chipset and a single antenna. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Global Navigation Satellite System (GNSS) or global position system (GPS) module 138 receives radio signals from a constellation of UPS satellites (not shown). From these signals, the module 138 can determine the position of the handheld mobile device 14, which may enable the device to determine whether it is at a known location, such as home or workplace. The GNSS module 138 may be similar to the GNSS module 22 provided in the vehicle electronics, and may provide similar functionality to the mobile device 14.

Cameras 120 and 122 may be digital cameras that are incorporated into device 14 and that enable device 14 to digitally capture images and videos. As shown in FIG. 3, camera 120 may be a front-facing camera, meaning that the camera faces an area in front of the front-side of the device 14, the front side being, in many embodiments, the side with the main visual display. Since an operator of a device 14 generally holds or positions such a device so that the visual display is in view, camera 120 in such an arrangement may face the operator, thereby allowing the operator to capture images and video of the operator (e.g., selfies) and/or behind and surrounding the operator. As shown in FIG. 4, camera 122 is a rear-facing camera, meaning that the camera faces an area away from the front side of the device. Thus, in such an arrangement of usual use of the mobile device as described above, the camera may capture images or video of an area in front of the operator. In another embodiment, multiple cameras may be located on the handheld mobile device 14 such that the cameras capture images or video of the same area or at least part of the same area. In yet another embodiment, a stereo camera (or stereoscopic camera) or other camera with multiple lenses or separate image sensors may be used. In either of such embodiments, the camera(s) may be used to capture more information pertaining to the captured area, such as three-dimensional characteristics (e.g., distances of objects in the captured area), as will be known by those skilled in the art.

In some embodiments, the images or video captured by the camera may be displayed on visual display 130 even when the user is not presently capturing images or recording videos to be stored, thereby allowing the user to view the area that is being captured by the camera on the display. Accordingly, the device 14 may overlay or dispose certain graphical objects over the displayed camera feed, as will be discussed more below. In addition, the cameras may each include a camera flash, such as camera flash 124 which is shown in FIG. 4 to be primarily for use with rear-facing camera 122; however, such camera flash 124 or other camera flashes (not shown) may be used for other purposes such as for providing light in dark or low-light environments or providing a warning or other indicator to gain the attention of nearby persons.

Furthermore, the cameras may, during operation of the collision avoidance application, record and/or store images that have been captured in memory 104. In one embodiment, the camera may capture and store video whenever the application is running. The device 14 may then delete video that is older than a predetermined amount of time (e.g., 5 minutes) unless an operator specifically provides an indication that the video should be saved. If a user does not indicate that he/she would like to save the video and the video is older than a predetermined amount of time old, the camera may delete the video and free up memory. In other embodiments, a user may desire to record video or images for the entire trip or time the application is running.

Handheld mobile device 14 also includes a number of user-device interfaces that provide users of the mobile device with a means of providing and/or receiving information. As used herein, the term "user-device interface" broadly includes any suitable form of electronic device, including both hardware and software components, which is located on the device and enables a user of the device to communicate with the device. Such examples of user-device interfaces include indicator 126, visual display (or touchscreen) 130, microphone 132, speaker 134, and pushbutton(s) 136. Indicator 126 may be one or more light indicators, such as light emitting diodes (LEDs), and, in some embodiments, may be located on a front-face of the device 14, as shown in FIG. 3. The indicator may be used for numerous purposes, such as to indicate to an operator of device 14 that there is a new notification on the device. Visual display or touch screen 130 is, in many embodiments, a graphics display, such as a touch screen located on the front face of the device 14, as shown in FIG. 3, and can be used to provide a multitude of input and output functions. Microphone 132 provides audio input to the device 14 to enable the user to provide voice commands and/or carry out hands-free calling via the wireless carrier system 70. Speaker 134 provides audio output to a vehicle occupant and can be a dedicated, stand-alone system or part of the primary device audio system. The pushbuttons 136 (only one shown) allow manual user input to provide other data, response, or control input. Other pushbuttons may be located on the device 14, such as a lock button on the side of the device 14, up and down volume controls, camera buttons, etc. Additionally, as those skilled in the art will appreciate, the pushbutton(s) do not need to be dedicated to a single functionality of the device 14, but may be used to provide interfacing means for a variety of different functionality. Various other vehicle user interfaces can also be utilized, as the interfaces of FIGS. 2-4 are only an example of one particular implementation.

The handheld mobile device 14 can include image processing techniques that can be used to recognize one or more objects that are in the field of view of cameras 120 and/or 122. Such techniques may be known to those skilled in the art, and may include recognizing vehicles, street signs, traffic signals, pedestrians, sidewalks, roadways, and/or other objects within the field of view of the cameras.

Also, the handheld mobile device 14 can include a vehicle-sharing application that can be used to provide a vehicle-sharing service interface, which can allow the user to request a vehicle to reserve for a particular time and/or at a particular location. In one embodiment, a user can start the application using an operating system included as part of the mobile device 14. Then, the user may be authenticated via credentials (e.g., a username and/or a password). The device 14 may send the credentials to a remote facility 80 or computer 78, which may then determine if the credentials authenticate and/or authorize the user for access to one or more features of the vehicle-sharing application. Or, the authentication and/or authorization may be used to determine a level of access to certain features of the application, certain vehicle that the user may request to reserve, etc. The authentication and/or authentication can be determined based on information stored in a database at the remote facility 80 and/or computer 78. Also, in some embodiments, a new user of the application may set up an account through entering information that is then verified and/or stored at a database included in remote facility 80 and/or computer 78.

After authentication/authorization, a user may request to reserve or use a nearby vehicle, or a vehicle at a particular location and/or during a particular time or time window. For example, the user can indicate their desire to reserve a vehicle or otherwise initiate a vehicle reservation request process by pressing a button on the touchscreen 130. The user may then enter information pertaining to the requested reservation, such as reservation parameters, and this can be done through pressing a button on touchscreen display 130, and/or through other various handheld mobile device-user interfacing means. The reservation parameters can include a time of day to begin the reservation, a time of day to end the reservation, a reservation length, a maximum and/or minimum price, a start location, an end location, a type of vehicle (e.g., sedan, SUV, pickup truck), other vehicle attributes, a threshold maximum distance, and/or a vehicle user experience rating. Vehicle attributes can include a model of the vehicle, a make of the vehicle, a model year of the vehicle, a fuel efficiency metric of the vehicle, an engine type of the vehicle, a safety rating of the vehicle, a storage capacity of the vehicle (e.g., trunk size, bed size), SRWC capabilities of the vehicle, height of the vehicle, length of the vehicle, passenger capacity of the vehicle, type of transmission of the vehicle (e.g., automatic, manual), type of fuel of the vehicle, engine attributes of the vehicle (e.g., number of cylinders, engine displacement volume, horsepower, torque, presence and/or type of turbochargers), and/or other various vehicle attributes that are known to those skilled in the art. The threshold maximum distance can be a reservation parameter that specifies a maximum distance the user desires the vehicle to be in with respect to the start location, which can be the user's present location or other location as indicated by the user. The threshold maximum distance can be a predetermined distance that is inputted as a reservation parameter by the user. Any or all of this information can be included in a vehicle information request that may be sent to a remote facility 80 or computer 78, which can then process the request.

In response to the vehicle information request, the remote server (e.g., a server at remote facility 80 or computer 78) can then generate a vehicle information response. This response may be generated based on the reservation parameters and in conjunction with data stored in a database at the remote facility 80 or computer 78. For example, the remote server can determine which vehicles are available for reservation, meet other reservation parameters, and which are within a certain distance from the location of the user (or device) that was included in the vehicle information request. Once this is determined, information pertaining to these vehicles, as discussed below, may be obtained (e.g., from a database at remote facility 80 or computer 78, or vehicles 12) and then sent to the handheld mobile device 14 as a vehicle information response. In the case where no vehicles meet the reservation parameters, a vehicle information response may be sent that includes data or information indicating that no vehicles match this criteria. The application on mobile device 14 may then present a notification to the user and may allow the user to modify their reservation parameters. The application may then send another vehicle information request with the modified reservation parameters.

In some embodiments, the remote facility 80 or computer 78 may send a vehicle inquiry message to one or more vehicles to retrieve more information pertaining to those vehicles, such as updated location information and/or usage information. The vehicle inquiry message can be sent via land network 76 and/or cellular carrier system 70 to vehicle 12, which may then store the message in memory 36. Vehicle 12 can process the message and may then carry out one or more operations in response to the message. For example, once vehicle 12 receives the vehicle inquiry message, vehicle 12 may determine a state of the vehicle (e.g., the state of one or more VSMs), a condition of the vehicle (e.g., the present location of the vehicle), or various other information that may be known or attainable at vehicle 12. The vehicle can then generate a vehicle inquiry response message and then send such response message to the remote facility 80 or computer 78. It should be appreciated that numerous vehicle inquiry messages can be generated and sent to numerous vehicles.

Once the vehicle inquiry response message is received at remote facility 80 or computer 78, the response may be processed (e.g., information may be extracted, security characteristics may be inspected) and stored at a memory device or database at remote facility 80 or computer 78. The information in the vehicle inquiry response(s) may be used and compiled into the vehicle information response, as discussed above. This response may then be sent to the handheld mobile device 14 via land network 76 and/or cellular carrier system 70.

Once the vehicle information response is received at the handheld mobile device 14, device 14 can use the information or data contained in the vehicle information response to generate one or more graphics. In one embodiment, the vehicle information response can include information pertaining to one or more vehicles, such as vehicle location (e.g., latitudinal and longitudinal coordinates), vehicle model, vehicle availability times, and/or any of the other reservation or vehicle attributes that are listed above. Any of this information can be stored in memory 104 and/or may be used by processor 102. Processor 102 can use this information to generate one or more graphics that represent this information. In some embodiments, the vehicle information response may contain graphics or images that can then be displayed by mobile device 14. Any of these graphics may be overlaid, disposed, superimposed, or otherwise displayed over the camera or video feed on visual display 130 of handheld mobile device 14.

The graphics that are displayed on the camera feed or video feed can be associated with an object in the field of view of the camera feed or may be associated with a location that corresponds to the information represented in the graphic. For example, the vehicle information response may contain location information pertaining to multiple vehicles 12. The application that provides the vehicle-sharing service interface can use this vehicle information and information of the handheld mobile device (e.g., the location and heading of device 14) to position the graphics over the camera feed and in a position that corresponds to the vehicle information.

For example, the application can use the vehicle location and the location of the mobile device to determine a distance therebetween. The vehicle can then obtain size (height, width) information for the model and model year of the vehicle (e.g., which may be included in the vehicle information response), as well as information pertaining to the field of view of the camera feed. Using this information, the vehicle can then render a graphic of the appropriate size. The application can also obtain heading information of the mobile device 14 (i.e., the direction the phone is facing) and then use this information, along with the location information, to determine the area that the camera's field of view is presently capturing and displaying on display 130. Thus, the application can then determine whether to display the graphic on the visual display and, if so, where on the visual display to render the graphic(s) (e.g., a graphic depicting a vehicle). This can allow a user to use the now-augmented camera feed on the visual display to assess information of one or more nearby vehicles in a visual manner. In some embodiments, one or more nearby vehicles may be near a user but behind one or more objects, such as a building. The augmented graphics that are generated by the device may aid the user in visualizing the nearby vehicles, which can aid in the users decision of whether to select a certain vehicle for reservation.

In some embodiments, if the user moves or changes position, subsequent vehicle information requests can be made using the user's new location. The subsequent vehicle information request may only be made after it is determined that the distance between the location of the user (or device) in the first vehicle information request and location of the user (or device) in the subsequent vehicle information request exceeds a predetermined threshold amount. The remote server (e.g., a server at remote facility 80 or computer 78) can then receive the subsequent vehicle information request(s) and, in response, can send vehicle information response(s) to the handheld mobile device 14 with updated vehicle information. It should be appreciated that these subsequent vehicle information requests may each trigger a vehicle inquiry request at the remote server that are then sent to certain vehicles, which then return information in a vehicle inquiry response message(s).

Also, once a user selects a vehicle, navigational aid graphics may be generated that aid a user in navigating to the selected vehicle. For example, these navigational aid graphics may include street labels, arrows, traffic signals, sidewalk indicators, and numerous other graphics, which can be generated and displayed on visual display 130 over the camera or video feed. The navigational aid graphics can be based upon map data (including roadmap, topographical information, points of interest), mobile device location data, vehicle information (e.g., information in the vehicle information response, other vehicle information stored on device 14 or obtainable by device 14), traffic signal data, and/or weather information (e.g., temperature, chances of precipitation, severe weather warnings). The application on device 14 can use this data, along with heading information of device 14, location information of device 14, and the field of view of the camera, to determine whether to render the navigational aid graphic(s) and where on the screen to render such graphic(s). These navigational aid graphics can be rendered at the same time as the other graphics discussed above that present vehicle information.

In some embodiments, the graphics that are generated may be presented on a touchscreen 130 and may be configured to perform an operation upon a user pressing or clicking on the region or area of the screen in which the graphic resides. For example, when a user touches an area on touchscreen 130 where a vehicle graphic is displayed, detailed information pertaining to that vehicle can be obtained and presented on touchscreen 130 or otherwise presented to the user, such as via speaker 134 or other user interfacing means. Once pressed, the user may then press another region of the touchscreen 130 to reserve that vehicle. After the reservation is made, which may require a user inputting more information and/or a series of communications between the mobile device 14, remote facility 80, computer 78, and/or the selected vehicle 12, the handheld mobile device 14 may generate navigation aid graphics such that the user's navigation to the reserved vehicle 12 is facilitated.

Figure 5:
FIG. 5 is a perspective view illustrating a field of view of a camera on a handheld mobile device.
Figure 6:
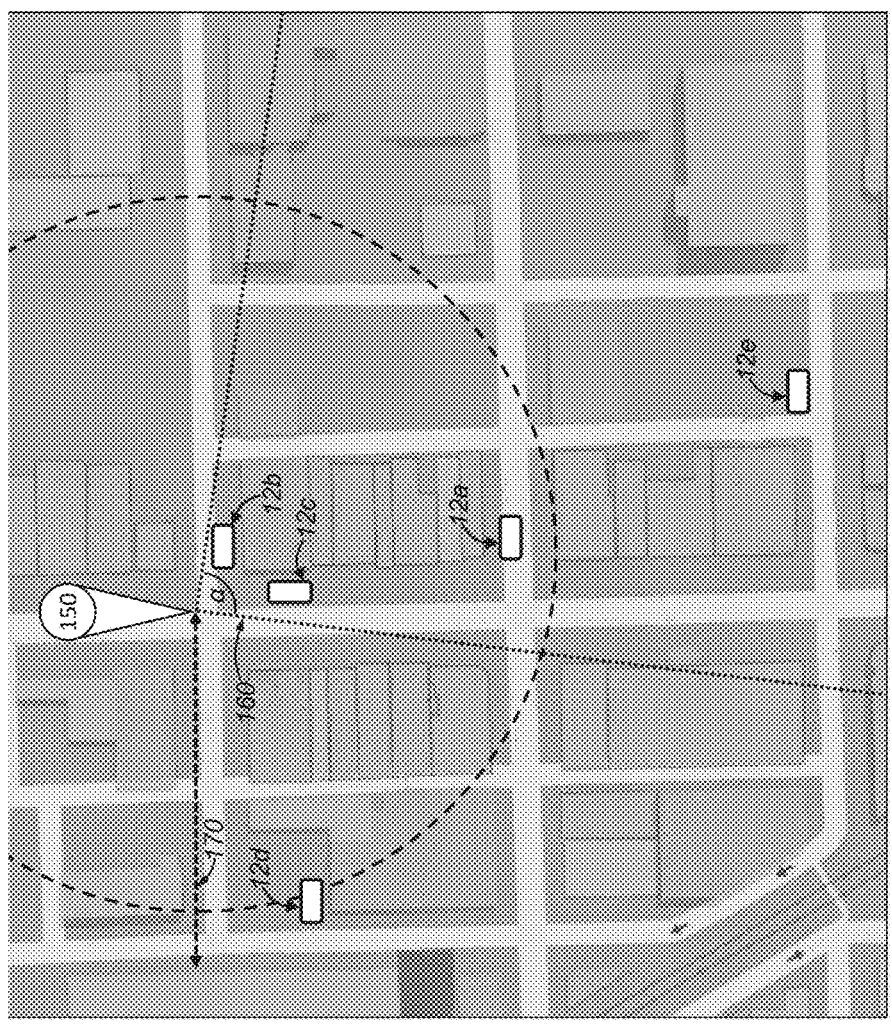
FIG. 6 is a block diagram illustrating a scenario that corresponds to the field of view of FIG. 5.

With reference to FIGS. 5 and 6, there is shown a scenario that a user may encounter when using handheld mobile device 14 to locate nearby vehicles to potentially reserve. FIG. 5 provides an illustration of the video or camera feed with overlaid graphics that may be displayed upon touchscreen 130 of mobile device 14. It should be appreciated that in the illustrated embodiment, the mobile device 14 may be rotated 90 degrees such that the user may view the camera feed in a landscape manner, as opposed to a portrait manner. FIG. 5 shows three vehicle graphics 212*a,b,c* that may be reserved by the user. As illustrated, vehicle graphics 212*a* and 212*b* are vehicle-shaped graphics that represent vehicles 12*a* and 12*b* (FIG. 6), while vehicle graphic 212*c* is a graphic that highlights the actual image of the vehicle 12*c*.

FIG. 6 shows a map view of the area in which the user is standing (shown as user location 150), the field of view of the camera 122 (field of view 160 with field of view angle α), and vehicles 12*a,b,c,d,e*. From this map view, a user can see that vehicle 12*a* is within field of view 160, but the actual view of vehicle 12*a* is obstructed by buildings and other objects. However, the vehicle-sharing service interface can still render a graphic to represent this vehicle that is within the field of view 160 so that the user may still be able to realize the direction in which the vehicle 12*a* is located. Also, vehicle 12*e* is within the field of view, but is more than a predetermined distance 170 away from the user's location 150 and, thus, is not rendered on the touchscreen 130. And, even though vehicle 12*d* is within the predetermined distance of location 150, vehicle 12*d* is not in the field of view 160 and is thus not presented on the screen. However, it is possible to render an indicator that indicates that a vehicle is within the predetermined distance 170 but not in the field of view of the camera 122, such as through rendering a graphic of an arrow pointing in the direction of vehicle 12*d*. A user may swap between an augmented reality view (FIG. 5) and a map view (FIG. 6) on the vehicle-sharing service interface that runs on their handheld mobile device 14.

Figure 7:
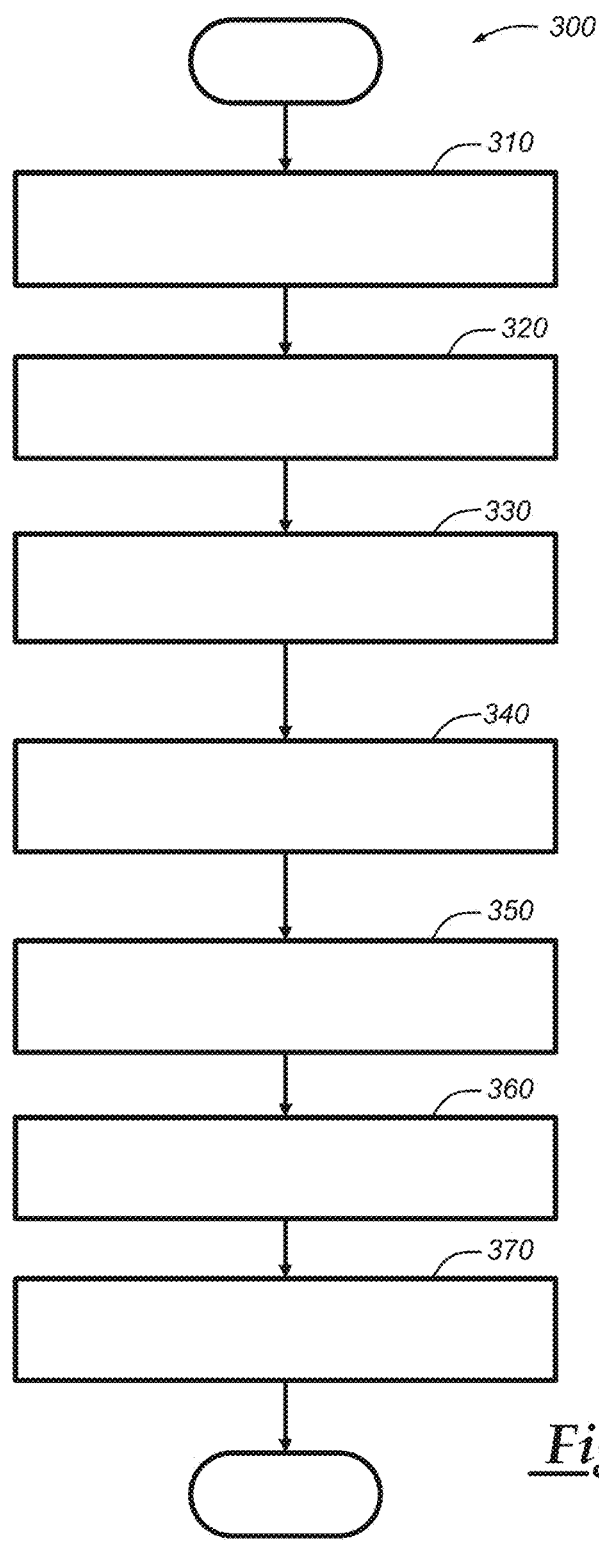
FIG. 7 is a flowchart illustrating an embodiment of a method of presenting vehicle information to a user at a handheld mobile device.

With reference to FIG. 7, there is shown an embodiment of a method 300 of presenting vehicle information to a user at a handheld mobile device. The method 300 begins with step 310, wherein an indication that the user desires to receive vehicle information is received. This request for vehicle information may be received, for example, as an indication that a vehicle reservation request application on the mobile device 14 has been initiated. The indication can be received through a user pressing a button that is displayed on touchscreen 130 or may be received via one or more other user-device interfaces. In another embodiment, a user may have previously scheduled a reservation time in which they would like to reserve or look to reserve a vehicle and, upon the detection of the reservation time occurring, an indication that the user desires to receive vehicle information can be received. In yet another embodiment, a remote server (e.g., a server at remote facility 80 or computer 78) can realize the occurrence of the reservation time and can thus send a notification to the device 14, or may send a vehicle information response to the device 14.

In some embodiments, the indication may indicate that the user desires to receive nearby vehicle availability information and vehicle location information, wherein the vehicle availability includes information relating to availability of one or more vehicles, and wherein the vehicle location information includes information relating to a location of the one or more vehicles. For example, the user may input one or more reservation parameters (as discussed above) and/or other information. This information may be inputted via one or more user-device interfaces and/or may be recalled from memory. In the case where the information is recalled from memory, the information may correlate to previously set reservation parameters that the user inputted for a previous reservation. The method 300 proceeds to step 320.

In step 320, a vehicle information request is sent to a remote server. The vehicle information request can include the location of the user and/or the handheld mobile device 14. In one scenario, the handheld mobile device 14 can use GNSS module 138 to receive GNSS signals from GNSS satellites, which may then be sent to the processor 102. The processor 102 can generate the vehicle information request; in some embodiments, the vehicle information request may be generated by an application that is executed by the processor 102, such as the vehicle-sharing application discussed above. In other embodiments, a specified location may be inputted by a user, such as through entering an address or identifying a location through touching an area on a map that is presented on touchscreen 130.

In some embodiments, the vehicle information request can include numerous other information, such as reservation parameters, which are discussed above. For example, a user may specify a maximum distance (e.g., 0.5 miles) in which the user desires to look for vehicles to reserve. Additionally, or alternatively, once the vehicle receives the indication in step 210, the vehicle can use one or more modules to determine other information pertaining to device 14. For example, heading information may be determined through use of the GNSS module 138, an accelerometer (i.e., inertial sensors) 140, a magnetometer, or other sensors included in device 14. Thereafter, the vehicle information request can be generated and, once the vehicle information request is generated, the handheld mobile device 14 can send the vehicle information request to a remote server, such as a server at remote facility 80 or computer 78. The method 300 proceeds to step 330.

In response to receiving the vehicle information request from the handheld mobile device 14, the remote server may process the request using a processor to generate a vehicle information response. The remote server can access information that is stored in a database or in a memory device. Alternatively, or additionally, the remote server may generate and send a vehicle inquiry message to one or more vehicles via land network 76 and/or cellular system 70. Once the remote server has received a vehicle inquiry response(s) from the vehicles or obtains the desired information from one or more databases, the remote server may generate the vehicle information response. The vehicle information response is then sent to the handheld mobile device 14 via land network 76 and/or cellular carrier system 70.

In step 330, the vehicle information response is received at the handheld mobile device 14. The vehicle information response can include information pertaining to the one or more vehicles within a predetermined distance or vicinity (e.g., predetermined distance 170 (FIG. 6)) of the location associated with the user. The location associated with the user may be the location that was included in the vehicle information request, and may be a present location of the user (at the time the vehicle information request was sent) or may be a specified location (e.g., an inputted address). Once the vehicle information response is received, the mobile device 14 may store the message, a part thereof, or other information derived therefrom in memory 104. The method 300 proceeds to step 340.

In step 340, a camera teed is displayed on a visual display of the handheld mobile device. For example, rear-facing camera 122 (which faces an area in front of the user when the user holds the device 14 up with the front of the device 14 facing the user) can capture video (or images), which can then be displayed on visual display 130. The video data or camera feed can include images of an area surrounding the user, such as those in the field of view 160 of the camera, as illustrated in FIGS. 5 and 6. The method 300 continues to step 350.

In step 350, based on the information pertaining to the one or more vehicles, one or more graphics representing at least part of the information pertaining to the one or more vehicles are generated. The graphics can be generated for all vehicles whose information was included in the vehicle information response and that are within the field of view 160 of the camera 122. Also, as the user moves (e.g., walks, bikes), a new or supplemental vehicle information request may be generated by mobile device 14 and sent to the remote server. The server may then response with a vehicle information response (e.g., which can be considered a vehicle information update response). Then, the graphics may be updated according to these subsequent vehicle information update response(s).

The types of graphics that may be generated can be of various shapes, sizes, colors, images, labels, and/or text. Graphics that may be rendered include: graphical representations of vehicles 12 (e.g., vehicles 12a,b,c), graphics indicating vehicles outside the field of view (e.g., vehicle 12d), graphics representing buttons or other input objects (e.g., cancel reservation button), and any other graphics that may be useful.

The generated graphics can then be displayed on the touchscreen 130. The graphics can be associated with an object in the field of view of the camera feed (e.g., such as a vehicle) or may be associated with a location that corresponds to the information represented in the graphics. The graphics can be used to supplement the video data such that the graphics aid a user in visualizing one or more vehicles within the predetermined distance and/or within the field of view 160 of camera 122. In such a case, the graphics in conjunction with the video data provide the user with an augmented reality that can facilitate a user's experience in interpreting vehicle information, which can then be used to make decision(s) on vehicle reservations, among other things. The method 300 continues to step 360.

In step 360, a user selection of a vehicle may be received at the handheld mobile device. For example, a user may click on a vehicle graphic or indicator, which may indicate that a user has selected that vehicle for reservation. In other embodiments, one or more other user-device interfaces may be used for selecting a vehicle to reserve. Once selected, a vehicle reservation message may be generated at the mobile device 14 and subsequently sent to the remote server. The remote server can then respond with a success or failure message, indicating that the vehicle is successfully reserved or not, respectively. The method 300 continues to step 370.

In step 370, if the reservation was successful, then one or more navigational aid graphics can be generated. These graphics may be overlaid, disposed, superimposed, or otherwise displayed over the camera feed, and, at this time, the other vehicle graphics can be removed from the video feed. The navigational aid graphics may include arrows, street signs, and other information (as discussed above). The method 300 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of presenting vehicle information to a user at a handheld mobile device, the method comprising:
   receiving a request from a user for vehicle information, wherein the request includes receiving one or more vehicle reservation parameters;
   sending a vehicle information request to a remote server, wherein the vehicle information request includes a location associated with the user and the one or more vehicle reservation parameters;
   receiving a vehicle information response at the handheld mobile device, wherein the vehicle information response includes information pertaining to a plurality of vehicles within a predetermined distance of the location associated with the user, wherein the information pertaining to the plurality of vehicles includes a vehicle location for each of the plurality of vehicles, and wherein the vehicle information response is sent to the handheld mobile device in response to the vehicle information request;
   displaying a camera feed on a visual display of the handheld mobile device, wherein the camera feed includes images or video captured by a camera installed in the handheld mobile device;
   based on the information pertaining to the plurality of vehicles, generating one or more graphics representing at least part of the information pertaining to the plurality of vehicles, wherein each of the one or more graphics is associated with an associated vehicle, and wherein the associated vehicle is one of the plurality of vehicles; and
   displaying the one or more graphics over the camera feed on the visual display of the handheld mobile device so that the handheld mobile device displays an augmented reality view that presents each of the one or more graphics at a location within the camera feed that corresponds to the vehicle location of the associated vehicle.

2. The method of claim 1, wherein the handheld mobile device is a smartphone, a tablet, a wearable mobile device, or an electronic ocular device.

3. The method of claim 1, wherein the location associated with the user is a present location of the user or a location that was inputted into the handheld mobile device by the user.

4. The method of claim 1, wherein the one or more reservation parameters includes the predetermined distance of the location associated with the user.

5. The method of claim 1, wherein the remote server is configured to generate the vehicle information response in response to receiving the vehicle information request.

6. The method of claim 5, wherein the remote server is further configured to retrieve information pertaining to the plurality of vehicles that are within the predetermined distance of the location associated with the user from a database located at the same location as the remote server.

7. The method of claim 6, wherein the remote server is configured to send one or more vehicle inquiry messages to the plurality of vehicles that are within the predetermined distance of the location associated with the user, and to receive one or more vehicle inquiry response messages from the plurality of vehicles that are within the predetermined distance of the location associated with the user.

8. The method of claim 7, wherein the remote server uses at least some data contained in the one or more vehicle inquiry response messages to generate the vehicle information response.

9. A method of presenting vehicle information to a user at a handheld mobile device, wherein the handheld mobile device includes a processing, a memory device, a camera, and a visual display, and wherein the method comprises:
   receiving a request from a user for nearby vehicle availability information and vehicle location information, wherein the vehicle availability information includes information relating to availability of one or more vehicles, and wherein the vehicle location information includes information relating to a location of the one or more vehicles;
   sending a vehicle information request to a remote server, wherein the vehicle information request includes a location associated with the user, wherein the location associated with the user is a present location of the user or a specified reservation location;
   receiving a vehicle information response at the handheld mobile device, wherein the vehicle information response includes information pertaining to the one or more vehicles within a predetermined distance of the location associated with the user, and wherein the vehicle information response is sent to the handheld mobile device in response to the vehicle information request;

receiving video data from the camera included in the handheld mobile device;

displaying the video data on the visual display of the handheld mobile device;

based on the information pertaining to the one or more vehicles, generating one or more graphics representing at least part of the information pertaining to the one or more vehicles; and displaying the one or more graphics over the video data on the visual display of the handheld mobile device, wherein the video data includes images of an area surrounding the user, wherein the one or more graphics are displayed on the visual display such that the graphics aid the user in locating at least one of the one or more vehicles.

10. The method of claim 9, wherein the one or more graphics each identify an associated one of the one or more vehicles, and wherein each of the one or more graphics is presented when a field of view of the camera includes a location in which the associated vehicle is located.

* * * * *